United States Patent
Tindal

(10) Patent No.: US 11,471,985 B2
(45) Date of Patent: Oct. 18, 2022

(54) TRIPOD JACK INNER CYLINDER REMOVAL TOOL

(71) Applicant: Government of the United States, as represented by the Secretary of the Air Force, Wright-Patterson AFB, OH (US)

(72) Inventor: Mitchell Tindal, Hartland, WI (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 17/674,278

(22) Filed: Feb. 17, 2022

(65) Prior Publication Data

US 2022/0168855 A1  Jun. 2, 2022

Related U.S. Application Data

(63) Continuation of application No. 17/327,738, filed on May 23, 2021, now Pat. No. 11,285,572.

(60) Provisional application No. 63/043,559, filed on Jun. 24, 2020.

(51) Int. Cl.
*B23P 19/04* (2006.01)
*B66F 13/00* (2006.01)

(52) U.S. Cl.
CPC ............. *B23P 19/04* (2013.01); *B66F 13/00* (2013.01)

(58) Field of Classification Search
CPC .................................. B23P 19/04; B66F 13/00
See application file for complete search history.

(56) References Cited

U.S. PATENT DOCUMENTS

| | | | | |
|---|---|---|---|---|
| 2,674,900 | A * | 4/1954 | Unterman | B64C 13/02 244/231 |
| 3,121,556 | A * | 2/1964 | Faulkner | B64F 5/50 16/33 |
| 3,244,385 | A * | 4/1966 | Fehring | B64C 25/34 244/103 R |
| 3,509,796 | A * | 5/1970 | Osborne | B66F 3/26 92/251 |
| 3,672,634 | A * | 6/1972 | Chaffin | B62B 3/0618 254/2 C |
| 4,181,290 | A * | 1/1980 | Affolter | B66F 19/005 254/124 |
| 5,975,496 | A * | 11/1999 | Hong | B66F 3/42 254/2 R |
| 7,604,207 | B2 * | 10/2009 | Hasloecher | F16M 13/02 248/171 |
| 8,322,106 | B2 * | 12/2012 | Simmons | E04H 12/2238 52/652.1 |
| 8,567,731 | B2 * | 10/2013 | Nakaniwa | F16M 11/36 248/163.1 |
| 9,114,964 | B2 * | 8/2015 | Spinazze | B66F 3/28 |

(Continued)

*Primary Examiner* — Bayan Salone
(74) *Attorney, Agent, or Firm* — AFMCLO/JAZ; Jeffrey R Moore

(57) ABSTRACT

A tripod jack cylinder removal tool including a lifting eyebolt attached through an up flange and further through and up flange aperture to a lock nut. The flange is secured to a pipe at a pipe top end, the pipe further having a bottom end wherein a down flange having a down flange aperture is attached to the pipe and a bolt having threads protrudes through a down flange aperture.

1 Claim, 2 Drawing Sheets

(56) References Cited

U.S. PATENT DOCUMENTS 9,557,001 B2 * 1/2017 Hubbs .................... F16M 11/36
11,285,572 B2 * 3/2022 Tindal .................... B66F 13/00

* cited by examiner

TRIPOD JACK INNER CYLINDER REMOVAL TOOL

Pursuant to 37 C.F.R. § 1.78(a)(4), this application claims the benefit of and priority to prior filed co-pending application Ser. No. 17/327,738 filed May 23, 2021 which further claims priority to Provisional Application Ser. No. 63/043,559, filed Jun. 24, 2020, both of which are expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to a tool for removing an inner cylinder of a tripod jack, such as a 60 ton aircraft tripod jack.

BACKGROUND OF THE INVENTION

A problem associated with prior removal of the inner cylinder include requiring as many as four personnel to use an overhead hoist with a 3 point chain attachment lifting the entire 2300lb tripod jack assembly then carefully placing the jack on its side using equipment jack stands to hold the tripod jack in place for access to remove and install all components. The present invention substantially improves the disassembly and assembly process, making it both easier and safer by eliminating the need to place the tripod jack on its side and more efficient by only requiring one member to remove and install the inner cylinder of a 60 ton tripod jack. The tripod jack inner cylinder removal tool provides these and other improvements over the prior tools and methods.

SUMMARY OF THE INVENTION

The present invention overcomes the foregoing problems and other shortcomings, drawbacks, and challenges of prior tripod jack inner cylinder removal. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention the tripod jack cylinder removal tool may include a lifting eyebolt attached through an up flange and further through and up flange aperture to a lock nut; wherein the up flange is secured to a pipe at a pipe top end, the pipe further having a bottom end wherein a down flange having a down flange aperture is attached to the pipe. The tripod jack cylinder removal tool further including a bolt having threads protrudes through a down flange aperture.

The tripod jack cylinder removal process may include a process wherein the tripod jack includes an inner cylinder having a base bolt hole. Further including preparing the tripod jack by removing the inner cylinder base bolt and seal to allow the draining of hydraulic fluid therein. Obtaining a tripod jack cylinder removal tool having a lifting eyebolt attached through an up flange and further through and up flange aperture to a lock nut. Having the up flange is secured to a pipe at a pipe top end, the pipe further having a bottom end wherein a down flange having a down flange aperture is attached to the pipe and a bolt having threads protrudes through a down flange aperture. Attaching the lifting eyebolt through the up flange aperture to a lock nut that attaches it to the pipe top; wherein the pipe bottom has attached a bolt wherein the bolt threads are threaded on to the inner cylinder base bolt hole and lifting the cylinder out of the tripod jack by the eyebolt.

The tripod jack cylinder removal process may further includes holding a replacement packing in place with the tripod jack cylinder removal tool bolt while reassembling the tripod jack.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Figure 1:
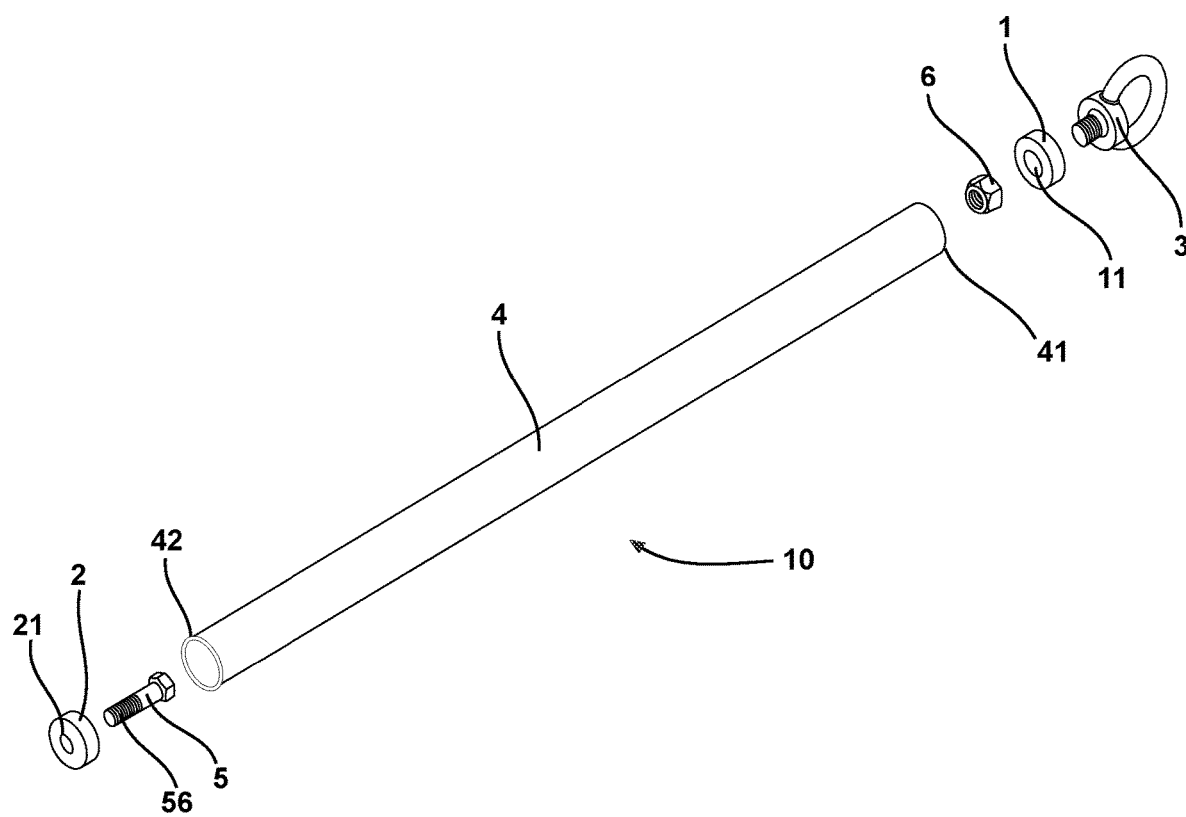
FIG. 1 is an exploded illustration of the components that make up one embodiment of the cylinder removal tool according to the present invention.

FIG. 1 is an exploded illustration of the present invention as a cylinder removal tool 10 according to the present invention. The cylinder removal tool 10 includes a lifting eyebolt 3, and an up flange 1 having an up flange aperture 11. The lifting eyebolt 3 may be attached through an up flange 1, through the up flange aperture 11 to a lock nut 6. The up flange 1 is secured to a top end 41 of a pipe 4. The pipe 4 further having a bottom end 42 wherein a down flange 2 having a down flange aperture 21 and is attached to the pipe 4 by a bolt 5. The bolt 5 protrudes through a down flange aperture 21. The bolt 5 is threaded and sized too secure to a tripod jack inner cylinder (not shown). The lifting eyebolt is designed to attached to any lifting means known in the art and be lifted away from the tripod jack, along with the tripod jack internal cylinder.

Figure 2:
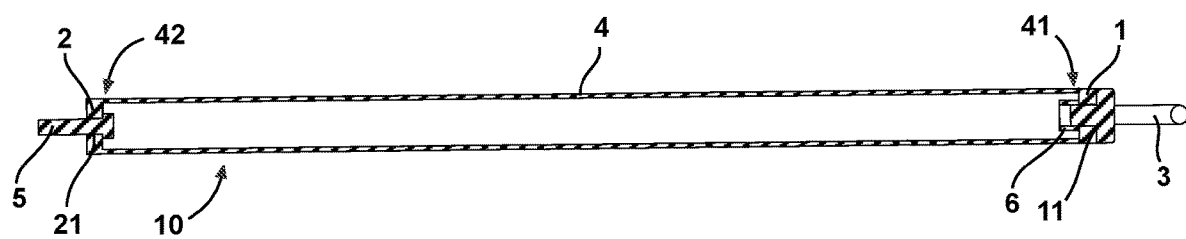
FIG. 2 is an illustration of on embodiment of the cylinder removal tool according to the present invention.

FIG. 2 is an assembled illustration of the present invention. The cylinder removal tool 10 is illustrated with the lifting eyebolt 3 attached through an up flange 1, through the up flange aperture 11 to the lock nut 6. The up flange 1 is secured to the top end 41 of the pipe 4. The pipe 4 is attached to the down flange 2 by any means known in the art. The bolt 5 protrudes through the down flange aperture 21 and is used to attach to the tripod jack inner cylinder (not shown). The bolt is threaded and sized too secure to the tripod jack inner cylinder (not shown or claimed) using bolt threads 56 (FIG. 1). The lifting eyebolt is designed to attached to any lifting means known in the art and be lifted away from the tripod jack.

The up flange 1 and down flange 2 may be separate components secured to pipe 4 by any means known in the art. Alternatively up flange 1 and/or down flange 2 may be integral to the pipe 4 by welding or forming the ends of the pipe according to standard manufacturing methods.

The tripod jack cylinder lifting tool is preferable designed to lift at least a 60 ton tripod jack internal cylinder with a typical design margin of safety in each component.

The new design facilitated an improved process for removing the tripod jack inner cylinder. The Inner Cylinder Removal Tool 10 may be inserted into the jack, through the jack and then threaded into a base bolt hole of the cylinder such that at least a portion of the Inner Cylinder Removal Tool bolt threads 56 protrude from the pipe bottom end 42 and attach to the inner cylinder base bolt hole (not shown or claimed). A hoist hook or any other means known in the art is then is then attached to the eyebolt 3 and the inner cylinder is pulled from the tripod jack for cleaning, lubrication and/or repair as needed.

The protruding Inner Cylinder Removal Tool bolt 5 may subsequently be used to hold new tripod jack replacement packing in place as the inner cylinder is lowered into the tripod jack for reassembly.

The bolt threads 56 may center & guide the inner cylinder back into the tripod jack for proper alignment. The tripod jack cylinder removal tool 10 may then be unthreaded from the tripod jack inner cylinder and disconnected from inner cylinder.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A tripod jack cylinder removal tool including: a lifting eyebolt attached through an up flange and further through an up flange aperture to a lock nut; wherein the up flange is secured to a pipe at a pipe top end, the pipe further having a bottom end wherein a down flange having a down flange aperture is attached to the pipe; a bolt having threads protrudes through a down flange aperture.

* * * * *